Oct. 2, 1923.
R. I. YOUNG
LUBRICATING DEVICE
Filed April 14, 1922
1,469,760
2 Sheets-Sheet 1
Fig. 1
Fig. 8
Fig. 9
Fig. 2
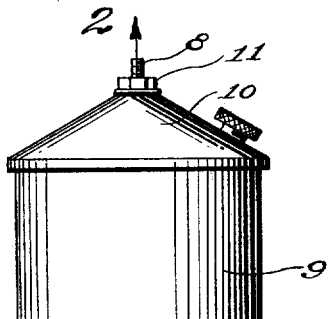
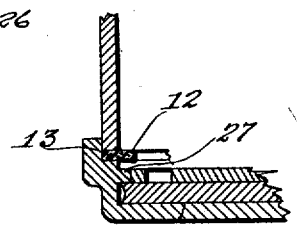
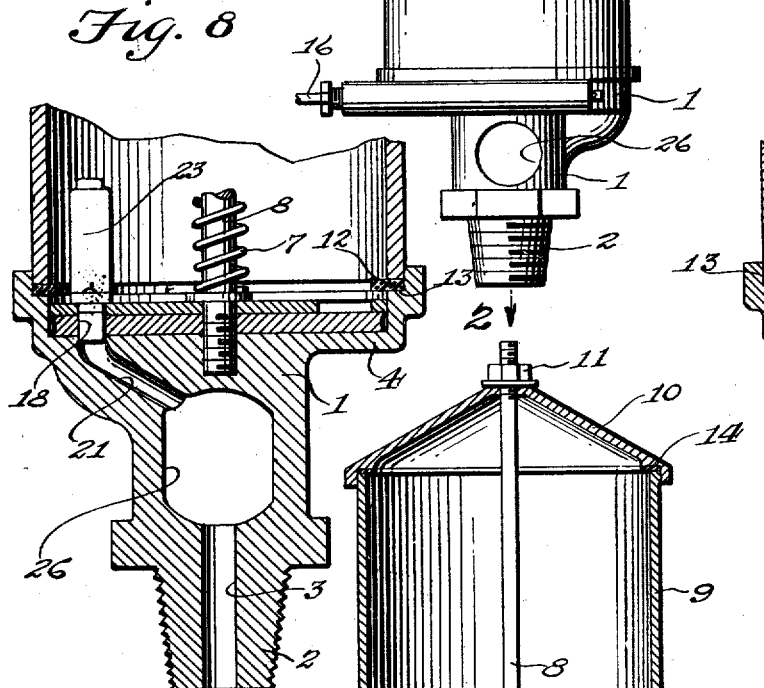
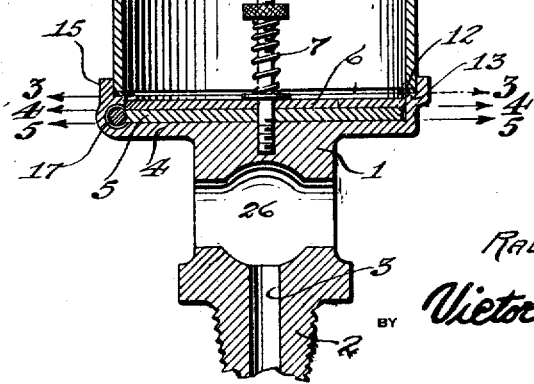
RALPH I. YOUNG
INVENTOR
BY Victor J. Evans
ATTORNEY Oct. 2, 1923.

R. I. YOUNG

LUBRICATING DEVICE

Filed April 14, 1922

RALPH I. YOUNG
INVENTOR

BY Victor J. Evans
ATTORNEY

Patented Oct. 2, 1923.

1,469,760

UNITED STATES PATENT OFFICE.

RALPH I. YOUNG, OF ODELL, NEBRASKA.

LUBRICATING DEVICE.

Application filed April 14, 1922. Serial No. 552,714.

*To all whom it may concern:*

Be it known that I, RALPH I. YOUNG, a citizen of the United States, residing at Odell, in the county of Gage and State of Nebraska, have invented new and useful Improvements in Lubricating Devices, of which the following is a specification.

This invention relates to lubricating devices, and an object of the invention is to provide a lubricating device comprising an oil cup and means for dispensing lubricating oil therefrom, the said means providing a positive uniform feed of lubricant which embodies a minimum amount of variation due to thick or thin oil or variation in temperature, and a mechanism which is designed to properly feed the lubricant independently of the temperature thereof, eliminating need of adjusting the mechanism when the oil becomes warm or heated, and it also eliminates the danger of burned bearings or scored cylinders due to improper lubrication caused by the emptying of the oiler when the oil becomes heated such as is the case in approved types of drip cup oilers.

Another object of this invention is to provide a lubricating device in which the quantity of lubricating oil fed to the working parts is in direct proportion to increase in speed of the rotatable or movable member to be lubricated, and further to provide a device which eliminates uncertainty in the lubricating action of working parts and also eliminates the necessity of frequent attention thereto, the said attention only being necessary for refilling purposes.

Other objects of the invention will appear in the following detailed description taken in connection with the accompanying drawings wherein:

Fig. 1 is a side elevation of the improved lubricator.

Fig. 2 is a vertical section through the lubricator.

Fig. 8 is a fragmentary vertical section taken on the line 8—8 of Fig. 6.

Fig. 9 is a detail vertical section taken on the line 9—9 of Fig. 6.

Figure 3:
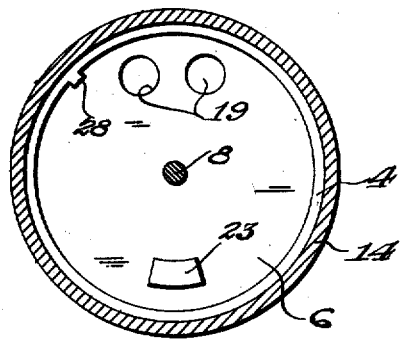
Fig. 3 is a horizontal section taken on the line 3—3 of Fig. 2.
Figure 4:
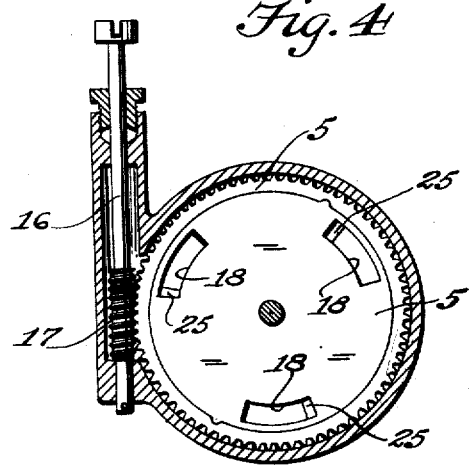
Fig. 4 is a horizontal section on the line 4—4 of Fig. 2.
Figure 5:
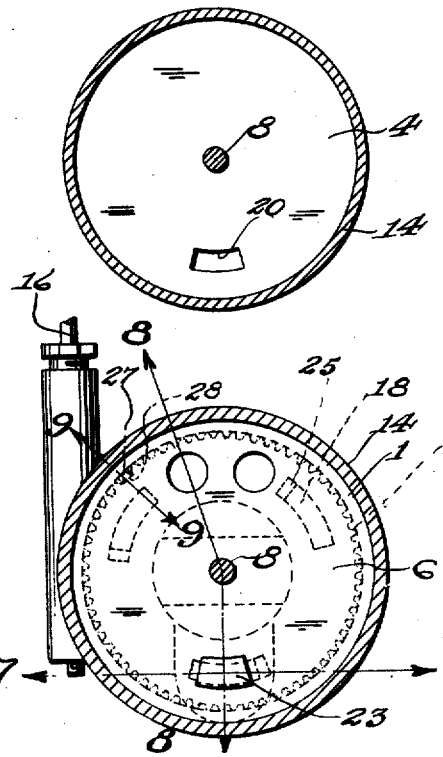
Fig. 5 is a horizontal section on the line 5—5 of Fig. 2.

Referring more particularly to the drawings, the improved lubricating device comprises a supporting base 1 having a threaded stem 2 therein which is adapted for threading into the bearing of a suitable rotatable or movable member to permit lubricant passing through the passageway 3 to lubricate the working surface. The supporting base 1 is provided with a flat supporting disc 4 on its upper end against which a worm gear 5 rests, the said worm gear being forced into tight engagement with the upper surface of the disc by means of the pressure disc 6 and spring 7 which act thereon. The spring 7 is coiled about the connecting bolt 8 which is threaded into the body 1 and projects axially through the cylindrical cup 9, extending through the apex of a conical top 10. A nut 11 is adjustably mounted upon the upper end of the bolt 8 for clamping the cylindrical cup 9 against the gasket 11 which rests upon an annular shoulder 13 and also clamps the conical top 10 against the gasket 14 which rests against the top edge of the cup 9 securely connecting the cup, top and base. The annular shoulder 13 is in turn formed upon the annular flange 15 formed about the perimeter of the disc 4.

Figure 7:
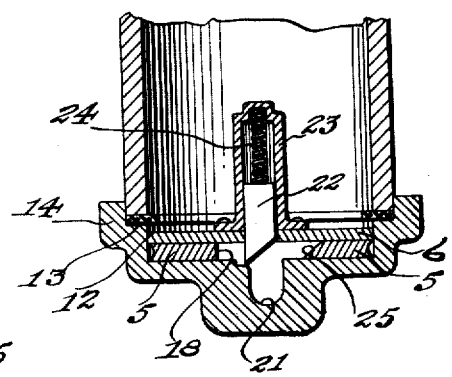
Fig. 7 is a fragmentary vertical section on the line 7—7 of Fig. 6.
Figure 6:
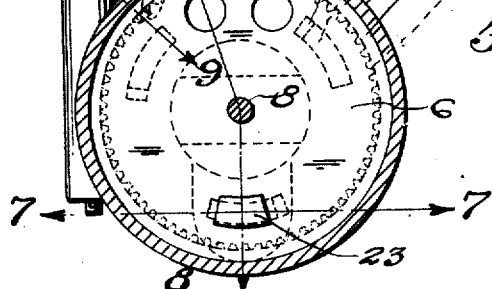
Fig. 6 is a horizontal section through the lubricator.

The bolt 8 acts as an axis for the worm gear 5 which gear is rotated from a shaft 16 by means of the worm 17 for bringing one of the openings 18 therein in registration with the openings 19 in the disc 6 to permit a quantity of lubricant to pass through the openings 19 into the opening 18, and as the gear continues to rotate, the respective opening 18 is brought into registration with an opening 20 in the base 4 at which time the lubricant is forced out of the opening 18 through the opening 20 into the inclined passageway 21 by means of a spring actuated pawl 22. The pawl 22 is slidably supported within a suitable guiding housing 23 and is urged outwardly by means of a spring 24 into the position as indicated in Fig. 7 of the drawings which will force all of the lubricant out of the openings in the gear 5, through the opening 20 and into the passageway 21. The edges 25 of the openings 18 are beveled as clearly shown in Fig. 7 of the drawings, to force the pawl 22 upwardly, to permit unimpeded rotation of the gear 5 and permit the pawl to act on the lubricant carried by one of the other openings in the gear, as the opening is moved into alignment with the pawl. The lubricant passes through the passageway 21 into the pocket 26 from where it passes into and through the passageway 3 to the surface to be lubricated. The pressure disc 6 is held against rotation by a lug 27 formed on the flange 14 and engaging in a suitable recess 28 formed in the perimeter of the disc.

The shaft 16 may be connected to any suitable driving shaft or mechanism for rotating the worm 17 which will in turn rotate the worm gear 5 moving it about so that the openings 18 will successively register with the openings 19 and receive quantities of lubricant therein, which lubricant will be forced out of the openings in the gear and into the passageway 21 by the pawl 22 when the respective opening 18 is moved into registration with the pawl.

From the foregoing description taken in connection with the accompanying drawings it will be apparent that the improved lubricating device will feed a pre-determined quantity of lubricant, uniformly, to the surface to be lubricated, irrespective of the density of the lubricant and also irrespective of the temperature of the lubricant or the bearings.

It is, of course, to be understood that the invention may be constructed in other manners and the parts associated in different relations and, therefore, I do not desire to be limited in any manner except as set forth in the claims hereunto appended.

Having thus described my invention what I claim is:

1. In a lubricating dispensing device, a lubricant container, a carrying body therefor provided with an outlet passageway, a worm gear rotatable within said body and provided with a plurality of lubricant receiving openings, means for rotating said worm gear, and a spring pressed pawl operating as a plunger for forcing lubricant from said openings upon movement of the openings into registration with said passageways.

2. In a lubricating dispensing device, a carrying body provided with an outlet passageway, a lubricant container carried by said body, a horizontally rotatable worm gear within said body and provided with a plurality of lubricant receiving openings, means for rotating said worm gear, a disc within said body between the worm gear and lubricant, said disc provided with a plurality of openings to permit deposit of lubricant in the openings of said worm gear, said worm gear openings adapted to discharge their lubricant upon their registration with said outlet passageway, and a spring pressed pawl operating as a plunger carried by said disc for projection through the lubricant carrying openings in said worm gear to force lubricant therefrom.

3. In a lubricating dispensing device, a carrying body provided with an outlet passageway, a lubricant container carried by said body, a horizontally rotatable worm gear within said body and provided with a plurality of lubricant receiving openings, means for rotating said worm gear, a disc within said body between the worm gear and lubricant, said disc provided with a plurality of openings to permit deposit of lubricant in the openings of said worm gear, said worm gear openings adapted to discharge their lubricant upon their registration with said outlet passageway, a spring pressed pawl operating as a plunger carried by said disc for projection through the lubricant carrying openings in said worm gear to force lubricant therefrom, means for preventing rotation of said disc, and a pressure spring engaging said disc and forcing it into engagement with said worm gear.

4. In a lubricating device, a lubricant container, a rotary member provided with lubricant receiving openings, an outlet passageway, and a spring pressed pawl operating as a plunger for forcing lubricant from said openings upon movement of the openings into registration with said passageway.

5. In a lubricating device, a lubricant container, a rotary member provided with lubricant receiving openings, an outlet passageway, a spring pressed pawl operating as a plunger for forcing lubricant from said openings upon movement of the openings into registration with said passageway, and a disc rotatable above said first named rotary member and provided with an opening to control the passage of lubricant into said first named lubricating openings.

6. In a lubricating device, a lubricant container, a rotary member provided with lubricant receiving openings, an outlet passageway, and spring actuated means operating as a plunger for forcing lubricant from said openings into said passageway upon movement of the openings into registration with said passageway.

7. In a lubricating device, a lubricant container, a worm gear rotatable therein, a worm meshing with said gear, means for rotating said worm, said worm gear provided with lubricant receiving openings, said container provided with an outlet passageway, and means for forcing lubricant from said openings into said passageway.

In testimony whereof I affix my signature.

RALPH I. YOUNG.